(No Model.)

T. A. BUTLER.
COMBINED ROLLER AND SEED SOWER.

No. 410,873.          Patented Sept. 10, 1889.

Witnesses          Inventor
Thomas A. Butler,
By his Attorney
Chas. H. Fowler.

UNITED STATES PATENT OFFICE.

THOMAS A. BUTLER, OF OLIVER SPRINGS, TENNESSEE.

COMBINED ROLLER AND SEED-SOWER.

SPECIFICATION forming part of Letters Patent No. 410,873, dated September 10, 1889.

Application filed May 18, 1889. Serial No. 311,271. (No model.)

*To all whom it may concern:*

Be it known that I, THOMAS A. BUTLER, a citizen of the United States, residing at Oliver Springs, in the county of Roane and State of Tennessee, have invented certain new and useful Improvements in a Combined Roller and Seed-Sower; and I do hereby declare that the following is a full, clear, and exact description of the same, reference being had to the annexed drawings, making a part of this specification, and to the letters and figures of reference marked thereon.

Figure 1:
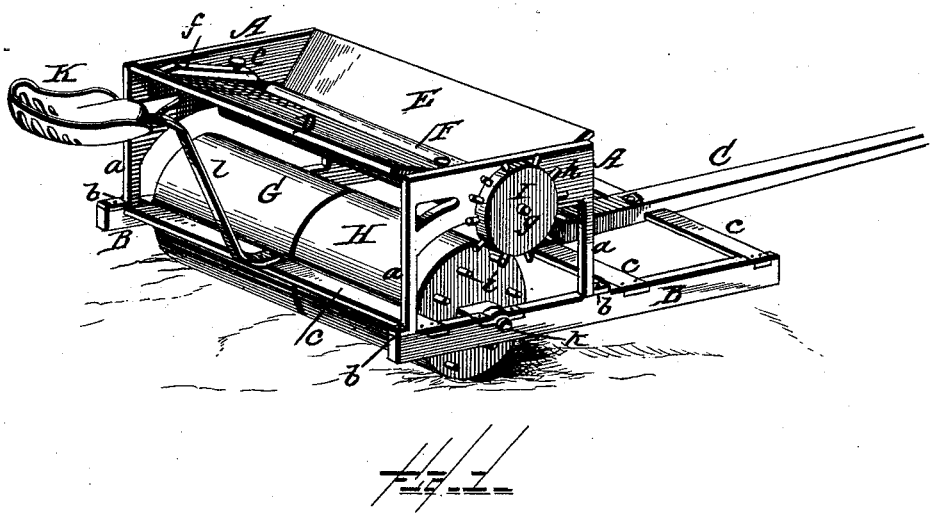
Figure 2:
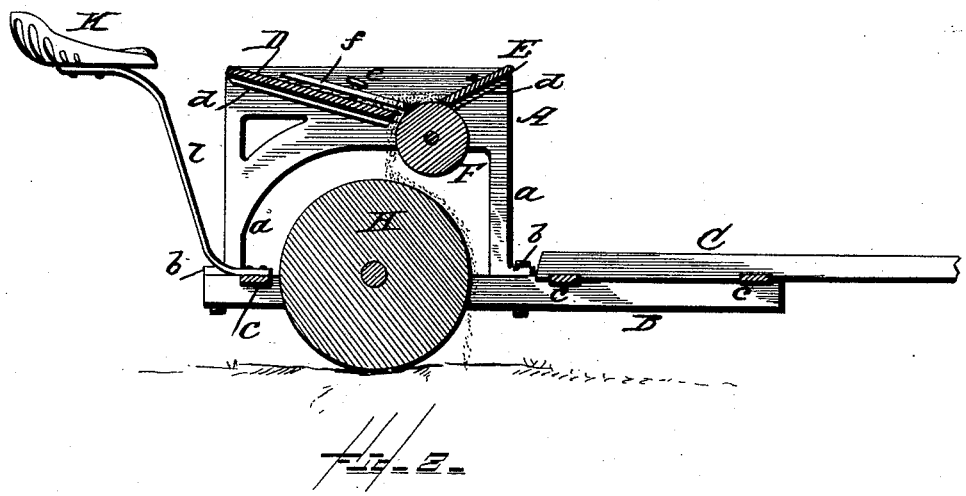

Figure 1 of the drawings is a perspective view of my improved roller and seed-sower, and Fig. 2 a vertical longitudinal section.

The present invention has for its object to provide a simple and effective agricultural machine that will both sow the seed and roll the land, and one in which the several operating parts can be readily removed from the frame for shipment or other purposes; and the invention consists in the several details of construction, substantially as shown in the drawings, and hereinafter described and claimed.

In the accompanying drawings the frame of the machine consists of three principal parts, which are detachably connected to each other, so that they can be separated and conveniently packed for transportation, and the operating parts are also removable in order that they can be packed separately.

The frame consists of the end sections A, preferably of metal, and having standards $a$ with flanges $b$ for bolting them to the side beams B, and to these beams are bolted transverse braces $c$, to the two front ones of which is detachably connected, by bolts or other well-known means, the tongue C.

To the inner sides of the end sections A are secured supporting-flanges $d$, upon which rest the inclined hopper-sections D E, the former being adjustable both in an inclined and a longitudinal direction by the set-screws $e$, which pass through flanges $f$ upon the inner sides of the end sections A of the frame. By the adjustability of the hopper-section D the seed is fed to the distributing-roller F as required, said roller having its bearings in the end sections of the frame. The seed from the roller F falls upon the rollers G H, from whence it is carried by the revolution of said rollers to the ground, said rollers acting as coverers and also as crushers to the soil after the seed has been sown.

The shaft $g$ of the distributing-roller F has rigidly connected to it a wheel I, having pins $h$ projecting from its periphery, which is designed to engage with similar pins $i$, projecting from the end of the roller H, the two rollers G H being keyed to the shaft $k$, which has its bearings in the side beams B. Thus when the rollers G H revolve motion will be imparted to the roller F by means of the pins $h\,i$.

A seat K is connected to the rear cross or scraper beam $c$ by means of the spring-bar $l$, and this bar, for convenience of removal, is detachable from said beam.

Having now fully described my invention, what I claim as new, and desire to secure by Letters Patent, is—

1. In a combined roller and seeder, the combination, with the side beams B and transverse braces $c$, of the end-frame sections A, having standards $a$ and flanges $b$, supports $d$ upon the inner sides thereof, and the hopper-sections D E, substantially as and for the purpose specified.

2. The frame consisting of the end sections A, having standards $a$ with flanges $b$, the side beams B, and transverse braces $c$, in combination with the hopper-sections D E, the former being adjustable, and the distributing-roller F, and the rollers G H, substantially as and for the purpose described.

In testimony that I claim the above I have hereunto subscribed my name in the presence of two witnesses.

THOMAS A. BUTLER.

Witnesses:
   MARY ANN REED,
   E. W. WILSON.